(12) United States Patent
Lukos (10) Patent No.: US 7,770,625 B2
(45) Date of Patent: Aug. 10, 2010

(54) ANTI-BOW ROLLER TUBE ARRANGEMENT

(76) Inventor: Stephen Lukos, 1879 Litchfield Rd., Watertown, CT (US) 06795

( * ) Notice: Subject to any disclaimer, the term of this patent is extended or adjusted under 35 U.S.C. 154(b) by 283 days.

(21) Appl. No.: 11/086,819

(22) Filed: Mar. 22, 2005

(65) Prior Publication Data

US 2006/0060313 A1     Mar. 23, 2006

Related U.S. Application Data (63) Continuation-in-part of application No. 10/943,302, filed on Sep. 17, 2004, now Pat. No. 7,134,473.

(51) Int. Cl.
*A47G 5/02* (2006.01)
(52) U.S. Cl. .................. 160/242; 160/323.1; 242/578.3
(58) Field of Classification Search .............. 160/242, 160/246–261, 24, 323.1; 242/578.3, 570, 242/595.1, 399, 399.1, 592, 390.3
See application file for complete search history.

(56) References Cited

U.S. PATENT DOCUMENTS

| | | | | |
|---|---|---|---|---|
| 30,236 | A | * | 10/1860 | McLean ...................... 160/298 |
| 120,971 | A | * | 11/1871 | Hoffmeister ................ 160/298 |
| 131,328 | A | * | 9/1872 | Binder ........................ 160/242 |
| 477,512 | A | | 6/1892 | Combis et al. |
| 1,595,234 | A | * | 8/1926 | Kuyper ....................... 160/23.1 |
| 1,611,413 | A | | 12/1926 | Case |
| 1,742,549 | A | | 1/1930 | MacArthur et al. |
| 1,797,321 | A | * | 3/1931 | Cahill ......................... 160/242 |
| 1,825,198 | A | * | 9/1931 | Negrini ...................... 160/242 |
| 2,060,582 | A | * | 11/1936 | Leffert ........................ 160/120 |
| 2,248,414 | A | * | 7/1941 | Schane ...................... 242/595.1 |
| 2,894,578 | A | | 7/1959 | Caesar et al. |
| 3,126,049 | A | * | 3/1964 | Hollands ...................... 160/40 |
| 3,421,568 | A | | 1/1969 | Youngs |
| 3,595,511 | A | * | 7/1971 | Summerville, Jr. .......... 248/264 |
| 3,882,921 | A | * | 5/1975 | Sandall ....................... 160/266 |
| 3,900,063 | A | | 8/1975 | Roller |
| 4,180,117 | A | | 12/1979 | Greer |
| 4,223,714 | A | | 9/1980 | Weinreich et al. |
| 4,323,105 | A | | 4/1982 | Berman et al. |
| 4,344,474 | A | | 8/1982 | Berman |
| 4,416,511 | A | * | 11/1983 | Weinberg .................... 359/461 |
| RE31,793 | E | | 1/1985 | Berman et al. |
| 5,121,782 | A | * | 6/1992 | Renkhoff et al. ............. 160/22 |
| 5,230,377 | A | | 7/1993 | Berman |
| 5,423,506 | A | | 6/1995 | Spoon |

(Continued)

FOREIGN PATENT DOCUMENTS

DE     196 54 668     4/1998

(Continued)

*Primary Examiner*—David Purol
(74) *Attorney, Agent, or Firm*—Lipsitz & McAllister, LLC (57) ABSTRACT

A support assembly is provided for a roller tube having a sheet material wound therearound. The support assembly has opposed first and second mounts adapted to support the roller tube, which is rotatably coupled to the mounts. At least one support cradle is disposed between the first and second mounts. The support cradle is configured to support the roller tube along a length thereof. A biasing member is arranged to reduce a force of the roller tube in a direction toward the support cradle, thereby preventing the sheet material from binding against the support cradle as it winds and/or unwinds.

25 Claims, 10 Drawing Sheets

U.S. PATENT DOCUMENTS

| | | | |
|---|---|---|---|
| 5,492,162 | A | 2/1996 | Lohausen |
| 5,505,418 | A * | 4/1996 | Corcoran ................. 248/254 |
| 5,819,831 | A * | 10/1998 | Schanz ................... 160/133 |
| 6,006,810 | A | 12/1999 | Malott |
| 6,024,152 | A | 2/2000 | Rosenich |
| 6,059,007 | A * | 5/2000 | Tomita ................... 160/242 |
| 6,164,428 | A | 12/2000 | Berman et al. |
| 6,290,164 | B1 | 9/2001 | O'Connor et al. |
| 6,357,686 | B1 | 3/2002 | Imai et al. |
| 6,402,110 | B1 | 6/2002 | Berman et al. |
| 6,817,399 | B2 | 11/2004 | Berman et al. |
| 7,134,473 | B2 * | 11/2006 | Lukos .................... 160/242 |
| 2004/0129850 | A1 | 7/2004 | Kirby |

FOREIGN PATENT DOCUMENTS

| | | |
|---|---|---|
| EP | 0 745 742 | 12/1996 |
| EP | 0 792 978 | 9/1997 |
| EP | 1 030 003 | 8/2000 |
| EP | 0 792 978 | 7/2002 |

\* cited by examiner

ANTI-BOW ROLLER TUBE ARRANGEMENT

BACKGROUND

This application is a continuation-in-part of co-pending U.S. patent application Ser. No. 10/943,302 filed on Sep. 17, 2004.

The present invention relates to a sheet material for such uses as solar screens and awnings, image (e.g., video and movie) projection screens, blackout screens, and insect blocking screens and more particularly, to a roller tube and assembly including an integral support cradle for a roll-fed sheet material.

Conventional roller tube systems make use of flexible sheet materials supported by elongated roller tubes. The roller tube, typically made from aluminum or steel, is rotatably supported and provides support for the flexible sheet material on the roller tube. Roller tube systems include manual and motorized systems. Manual roller tube systems have spring or gear driven roller tubes. Motorized roller tube systems have drive motors engaging the roller tube to rotatingly drive the tube. The drive motors for motorized roller tube systems include externally mounted motors engaging an end of the roller tube and internal motors that are received within an interior defined by the tube.

Conventional roller tube systems have support systems that engage the opposite ends of the roller tube to provide the rotatable support that is required for winding and unwinding of the flexible sheet material. The support system includes a drive end support assembly having a coupler engaging the open end of the tube for rotation. The coupler is adapted to receive the drive shaft of a motor such that rotation of the drive shaft is transferred to the coupler for rotation of the tube. The motor is secured to a bracket for attachment of the roller tube system to the wall or ceiling of a structure, for example. A coupler engaging an opposite end of the roller tube could receive a motor drive shaft or, alternatively, could receive a rotatably supported shaft of an idler assembly.

A roller tube supported in a conventional manner from the opposite ends will deflect in response to transverse loading, from the weight of an attached sheet material, for example. The response of a roller tube, supported at its ends in a conventional manner, from the weight of a flexible sheet material as well as from self-weight of the tube, results in a downward "sagging" deflection in a central portion of the roller tube with respect to the supported ends.

For roller tubes used with wider sheet materials (e.g., widths of 10 to 30 feet or more), support of the correspondingly long roller tubes in a conventional manner can result in sagging deflection detrimental to the appearance of a supported sheet material. V-shaped wrinkles, also known as "smiles", can be formed in an unrolled sheet material supported by a sagging roller tube. Sagging deflection in a conventionally supported roller tube can also have a detrimental effect on operation. Moreover, any deflection in the roller tube can cause permanent damage to the sheet material (e.g. fabric, vinyl, polyester, acrylic, fiberglass). Video projection screen material is particularly prone to damage reducing visibility and performance over time.

During winding and/or unwinding of a sheet material, the sheet material is drawn onto the tube in a direction that is substantially perpendicular to the axis of the tube. Due to curvature along the length of a sagging tube, opposite end portions of a supported roller tube system will tend to track towards the center portion of the tube as the sheet material is rolled onto the tube. Such uneven tracking can cause the opposite end portions of the sheet material to be wound more tightly onto the end portions of the roller tube than the central portion of the roller tube. As a result, the central portion of the sheet material is not pulled tightly to the tube causing it to tend to buckle. This buckling of the central portion of the sheet material, if severe enough, can create variations in radial dimensions of the rolled sheet material along the length of the tube, thereby impairing subsequent rolling of lower portions of the sheet material. Uneven tracking can also cause surface discontinuities, known as "golf balls," that include a permanent sagging pocket shaped discontinuity in the sheet material.

The problem of sagging deflection in longer roller tubes has been addressed in prior art roller tube systems by increasing the diameter of the roller tube. Although increasing the roller tube diameter serves to reduce sagging deflection in conventional end-supported tubes, there are undesirable consequences associated with such a solution. Increasing the diameter of the roller tube increases weight, thereby potentially affecting the size and type of structure capable of providing rotatable support for the tube. Also, additional space required by the larger diameter roller tube and its associated support structure may not be readily available in many installations. Even if space is available, the bulky nature of the system due to the required large roller tube diameter is often objectionable for aesthetic reasons.

Other prior art attempts at preventing sagging involve the use of center supports and/or elongate support rollers in a variety of configurations located below the rotational axis of the roller tube. The elongate support rollers add weight and complexity to the roller tube system. The increased costs and failure mechanisms inherent in the more complex support systems diminish the advantages provided.

It would be advantageous to provide a method and an apparatus to ensure that roller tube sagging is prevented without the added costs and complexity of the prior art systems. The present invention provides the aforementioned and other advantages.

SUMMARY OF THE INVENTION

In accordance with the present invention, a support assembly is provided for a roller tube. The roller tube is adapted to support a sheet material wound therearound. First and second opposed mounts are provided. The mounts are configured to rotatably support the roller tube. At least one support cradle is disposed between the first and second mounts, and configured to support the roller tube along a length thereof. A biasing member is arranged to reduce a force of the roller tube in a direction toward the support cradle. The reduced force lessens the likelihood of the sheet material binding against the support cradle as it winds and/or unwinds. Reducing the force is particularly useful for roller tube systems in which friction occurs between the roller tube and the support cradle, such as roller tube systems including a drive motor, sheet material wider than about thirteen feet, a heavy roller tube body, or heavy sheet material. The weight of the roller tube determines whether a biasing member is necessary and the amount of reducing force that should be provided by the biasing member.

In an exemplary embodiment, the roller tube body can have a cylindrical shape. The sheet material can be one of a screen configured to shade sunlight, a fabric configured to shade sunlight, a screen configured for image (e.g., video or movie) projection, a screen configured to block insects, or any other flexible sheet material rolled into a roller tube system as is known in the art. The assembly can be configured to releasably contain the roller tube and sheet material thereon and discharge the sheet material proximate the support cradle. The first mount and second mount can be configured to provide both rotary support and translational support to the roller tube. Each of the first and second mounts can include at least one slot formed in the assembly at each of the first and second ends respectively.

The configuration can include a central slot bounded by two opposing side slots, wherein the central slot is configured to support an idler and the opposing side slots can be configured to support at least one of a motor and a drive gear. The slot can be configured to guide and support the roller tube responsive to a variable diameter of the roller tube and sheet material. In another exemplary embodiment, the first and second mounts each can include a slotted insert configured to couple to the first and second ends of the assembly. The slotted insert can include an idler groove between a pair of side grooves. The pair of side grooves can be configured to support at least one of a motor bearing and a drive gear bearing. The slotted insert can be concealable in an interior of the assembly. The slotted insert can include a sliding block movably positioned in at least one slot or groove. Each of the first and second mounts can include a pivot arm assembly configured to support the roller tube. The pivot arm assembly can be pivotably coupled to the assembly proximate the first mount and the second mount respectively and concealable in the interior of the assembly. The pivot arm assembly can include an idler receiver and a set of opposing receivers adjacent the idler receiver. The pivot arm assembly can be configured to guide and support the roller tube responsive to a variable diameter of the roller tube and sheet material. The support cradle can be fixed with respect to the assembly and the roller tube. The support cradle can be crescent shaped. The support cradle can contact the sheet material proximate a lower portion of the roller tube. The support cradle can be formed integral with the assembly. The support cradle can support the roller tube and sheet material below an axis of rotation of the roller tube. The support cradle can support the roller tube body substantially along the entire length of the tube body. The support cradle can continuously support the roller tube body and the sheet material along the length responsive to variation of a diameter of the sheet material wound around the roller tube body resulting from winding and unwinding the sheet material around the roller tube body.

The biasing member can be disposed near the first mount and a second biasing member can be disposed near the second mount. The biasing member can be disposed in a biasing member retainer. The biasing member retainer can be disposed on the assembly. The biasing member retainer may be disposed integral to the assembly. The biasing member retainer can alternatively be disposed on the first mount. The biasing member retainer may be disposed integral to the first mount. The biasing member retainer can be disposed on the support cradle. The biasing member retainer may be disposed integral to the support cradle. The biasing member can be a spring. The spring may be a leaf spring, a coil spring, a compression spring, a gas spring, a urethane spring, or any other device that can reduce the force of the roller tube body in the direction of the support cradle. The biasing member can be fixedly mounted above or below the axis of rotation of the roller tube. Alternatively, the biasing member can be fixedly mounted laterally to the axis of rotation of the roller tube.

The support cradle can be fixed with respect to the assembly and the roller tube. The first mount and second mount can be configured to guide and support the roller tube responsive to a variable diameter of the roller tube and sheet material. The support cradle can also support the roller tube and the sheet material responsive to a variable diameter of the roller tube and sheet material. At least one support cradle can support the roller tube along substantially the entire length of the roller tube. Alternatively, at least one support cradle can support the roller tube in at least one location between the first and second mounts. An aperture can be provided through the first mount to form a pivot mount slot. A gear mount can be fixedly connected to a roller tube end cap and pass through the pivot mount slot.

An exemplary method of supporting a roller tube is provided. The method provides for disposing a sheet material on the roller tube. The roller tube includes a body having a first end and a second end. The sheet material can be wound around the roller tube body along a length of the body between the first end and the second end. The roller tube can be mounted in an assembly. The assembly can include a first mount and a second mount opposite thereof. The roller tube can be supported on the first and second mounts wherein the roller tube is rotatable for winding and unwinding the sheet material on the roller tube. The method includes supporting the roller tube on a support cradle coupled to the assembly. The support cradle can be integrally fixed to the assembly. The method includes reducing a force of the roller tube in a direction toward the support cradle. The force reduction can be provided to reduce the contact between the roller tube and the support cradle while the roller tube is rotated. Reducing the force is particularly useful for roller tube systems in which friction occurs between the roller tube and the support cradle, such as roller tube systems including a drive motor, sheet material wider than about thirteen feet, a heavy roller tube body, or heavy sheet material. The weight of the roller tube determines whether a biasing member is necessary and the amount of reducing force that should be provided by the biasing member. Moreover, if the roller tube is rotated by a mechanical device imparting high torque to the roller tube, increased friction may result between the material on the roller tube and the support cradle. It is noted that any discussion herein concerning contact between the roller tube and the support cradle generally means contact between the sheet material wound on the roller tube and the support cradle, unless the material is completely unwound from the roller tube. Moreover, discussions concerning supporting the roller tube also mean supporting the sheet material wound on and/or hanging from the roller tube. Generally, when sheet material is wound on the roller tube, the roller tube will be supported by the support cradle via the sheet material.

In an exemplary embodiment, the invention provides for supporting the roller tube at each of the first and second mounts in both a rotary motion and a translational motion responsive to a variable diameter of the sheet material on the roller tube. The first and second mounts comprise one of a slot formed in the assembly and a slotted insert mounted in an interior of the assembly and a pivot arm assembly mounted in the interior. The method can provide for concealing the first and second mounts in an interior of the assembly. The roller tube can be prevented from deflection along the length by the cradle support. Surface discontinuities can be prevented along a surface of the sheet material responsive to winding and/or unwinding the sheet material across the cradle support.

At least one biasing member can be disposed near at least one of the first and second mounts to reduce the force of the roller tube toward the support cradle. The at least one biasing member can be disposed on the assembly, on at least one of the first and second mounts, or on the support cradle. The method can provide for concealing the at least one biasing member in an interior of the assembly. The support cradle can support the roller tube along substantially its entire length. Alternatively, the support cradle can support the roller tube in at least one location between the first and second mounts. The method can further provide for adjusting the reduction of force of the roller tube in the direction toward the support cradle.

In accordance with the present invention, a support assembly is provided for a roller tube. The roller tube is adapted to support a projection screen (e.g., video or movie) wound therearound. First and second opposed mounts are provided. The mounts are configured to rotatably support the roller tube. At least one support cradle is disposed between the first and second mounts, and configured to support the roller tube along a length thereof. At least one of the first mount and the second mount can include at least one slot and a sliding block movably positioned in the at least one slot.

BRIEF DESCRIPTION OF THE DRAWINGS

Referring now to the figures, wherein like elements are numbered alike.

DETAILED DESCRIPTION OF THE INVENTION

A roller tube support assembly in accordance with the present invention can include a first mount and a second mount opposite each other. The assembly can be configured to rotatably support a roller tube between the first mount and the second mount. The roller tube includes a body defining a length between a first end and a second end. The roller tube can be configured to support a sheet material wound around the roller tube body along the length of the body between the first and second ends of the body. Alternatively, the roller tube can be configured to support multiple widths of sheet material wound around the roller tube body to provide a single roller tube system for adjacent windows separated by mullions. A support cradle can be coupled to the assembly between the first and second mounts. The support cradle can be configured to support the roller tube. A biasing member is arranged to reduce a force of the roller tube in a direction towards the support cradle. By reducing the force of the roller tube towards the support cradle, the biasing member reduces the friction between the sheet material the support cradle. This reduces any likelihood that the sheet material will bind to the support cradle as it is wound onto and/or unwound from the roller tube. The reduced force on the roller tube will also serve to extend the life of the sheet material wound on the tube by reducing friction between the sheet material and the cradle support. For example, a sheet material configured for image projection may have a coating that could deteriorate due to excessive abrasive contact between the sheet material and the support cradle. The sheet material can comprise, for example, one of a solar screen or awning material for an awning, such as lateral arm awnings or retractable window awnings, a screen configured to shade sunlight, a screen configured to block light, a fabric configured to shade sunlight, an image projection screen configured for, e.g., video or movie projection, a screen configured to block insects, or any other flexible sheet material retracted periodically as is known in the art.

Figure 1:
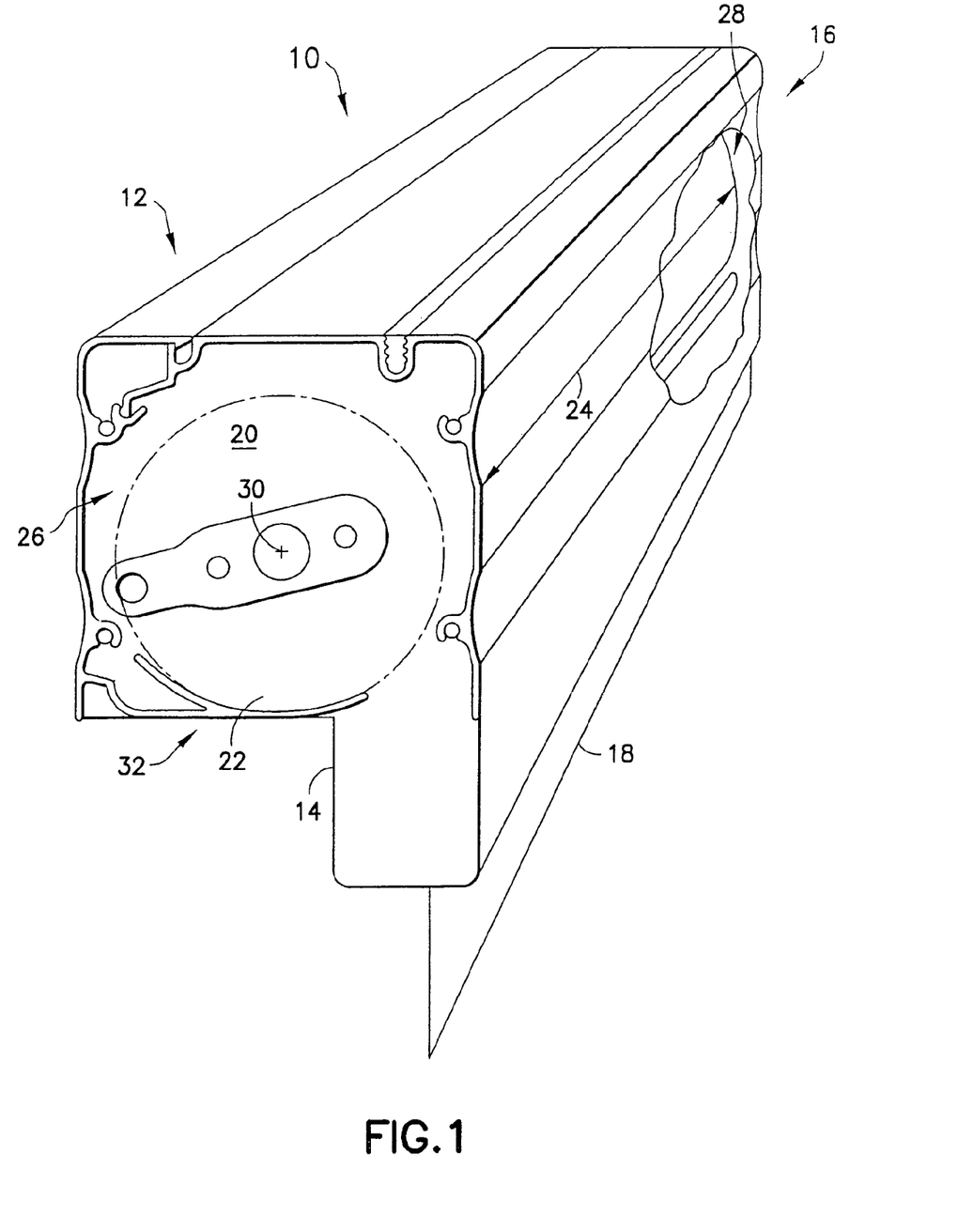
FIG. 1 is a perspective view of an exemplary roller tube support assembly.
Figure 2:
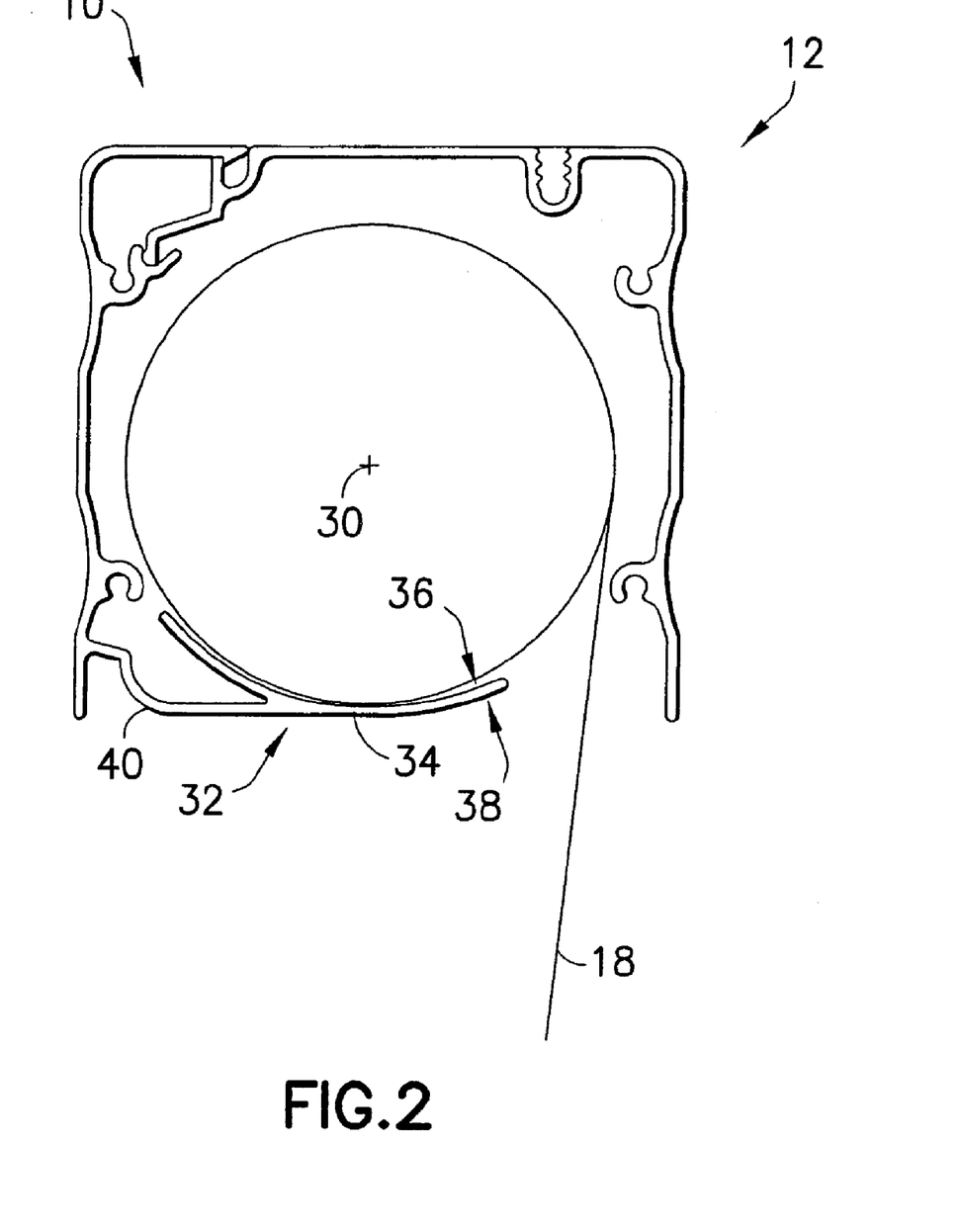
FIG. 2 is a side view of an exemplary roller tube support assembly.

FIGS. 1 and 2 illustrate exemplary embodiments of the roller tube mechanism 10. The roller tube mechanism 10 includes an assembly 12 that extends laterally between a first mount 14 and a second mount 16 opposite the first mount 14. The assembly 12 can be mounted on a wall, ceiling, or the like, to provide a stable position to deploy a sheet material 18. The assembly 12 can be constructed of a rigid material through various means including, for example, extruded aluminum, and the like.

A roller tube 20 is rotatably mounted in the assembly 12. The roller tube 20 can be pivotably supported on the first mount 14 and second mount 16. The roller tube 20 includes a roller tube body 22 that extends along a length 24 between a first end 26 and a second end 28. The roller tube body 22 can have a cylindrical shape including a circular cross-section extending along the length 24. The roller tube 20 is configured to support the sheet material 18, such as solar screen material. The sheet material 18 can be wound around the roller tube body 22 about an axis of rotation (axis) 30 of the roller tube 20. As the sheet material 18 is wound (wrapped) around the roller tube body 22, the diameter of the roller tube 20 and sheet material 18 increases. As the sheet material is unwound, the diameter of the roller tube 20 and sheet material 18 decreases.

A support cradle 32 is coupled to the assembly 12. The support cradle 32 extends between the first mount 14 and the second mount 16. The support cradle 32 is configured to support the roller tube 20 and sheet material 18 wound thereon. More specifically, the support cradle 32 supports the roller tube 20 along the entire length 24 of the roller tube 20. The roller tube 20 is prevented from bowing along the length 24 due to the support from the support cradle 32. In an exemplary embodiment, the support cradle 32 can comprise a portion of the assembly 12. In another embodiment, the support cradle 32 can be formed separate from the assembly 12 and coupled to the assembly 12.

The support cradle 32 is positioned such that the roller tube 20 and sheet material 18 rest on top of the support cradle 32. The support cradle 32 can be positioned such that an upper surface 36 contacts the sheet material near a lower portion of the roller tube 20 below the axis 30. The support cradle 32 can support the roller tube 20 and sheet material 18 throughout the winding and unwinding of the sheet material 18 during which the outer diameter of the sheet material 18 on the roller tube 20 varies. As used herein, the concept of contact between the roller tube and the support cradle generally means contact between the sheet material wound on the roller tube and the support cradle, unless the material is completely unwound from the roller tube. Moreover, the concept of supporting the roller tube also means supporting the sheet material wound on and/or hanging from the roller tube. Generally, when sheet material is wound on the roller tube, the roller tube will be supported by the support cradle via the sheet material.

The support cradle 32 comprises a base 34 including the upper surface 36 and a lower surface 38. The base 34 can be formed into an elongate arcuate beam cupped to support the arcuate shape of the outer diameter of the roller 20 and sheet material 18 wrapped on the roller 20. The base 34 can include a width that extends outward a distance sufficient to support the roller 20 without snagging or binding to roller 20. In another exemplary embodiment, the base 34 can include a width approximately the size of a quarter of the outer perimeter of the roller 20 and sheet material 18 thereon. A coupling arm 40 can extend from the lower surface 38 and couple to the assembly 12. In a preferred embodiment, the base 34 can have a crescent shaped cross-section. In another embodiment, the base 34 can be a circular cross-section, or the like. The shape of the support cradle 32 can substantially mate to the shape of the roller tube 20 and sheet material 18. In a preferred exemplary embodiment, the upper surface can include a coating (not shown) that enables the sheet material 18 to slide across the support cradle upper surface 36 without sticking, being marked, or discolored. Preferably, the upper surface 36 is coated (e.g., painted) to prevent the surfaces of the sheet material 18 from being marked (e.g., by aluminum oxide) as the material 18 winds and/or unwinds. Alternatively, the support cradle 32 can be manufactured using a material such as high-density polyurethane, PVC, or the like. The tip of the support cradle 32 can be capped with a material having a low coefficient of friction (not shown) such as high density polyethylene, or the like, to prevent the surfaces of the material 18 from being marked and reduce the likelihood of the sheet material 18 binding on the support cradle 32. The support cradle 32 is rigid and does not move relative to the roller tube 20, sheet material 18 or assembly 12. The support cradle 32 can extend the entire length 24 of the roller tube 20 in a preferred embodiment. It is also contemplated that the support cradle 32 can extend substantially the length 24 of the roller tube 20 and variations thereof. In an exemplary embodiment, the support cradle 32 can be integrally formed from the assembly 12. The support cradle 32 can extend in a single contiguous length. In another embodiment, the support cradle 32 can include segmentation and discontinuities along the length and/or the width of the base 34. The support cradle 32 prevents the roller tube 20 from deflecting along the length 24 and resultantly prevents surface discontinuities from forming in the sheet material 18 as the sheet material 18 is dispensed out of the assembly 12.

Figure 3:
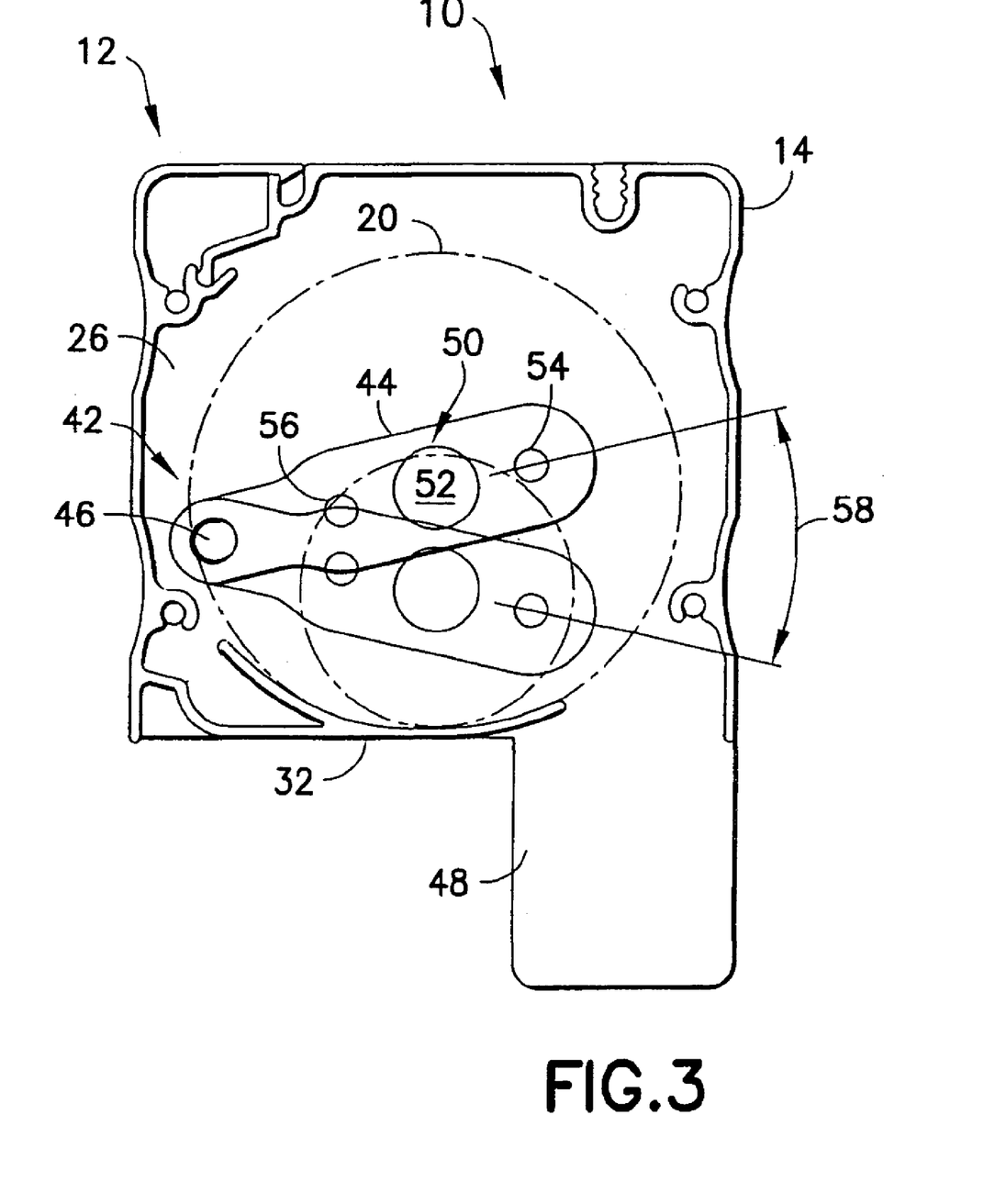
FIG. 3 is a side view of an exemplary roller tube support assembly.

Referring to FIG. 3, an exemplary roller tube mechanism 10 is illustrated from a side view. The roller tube 20 is supported on both ends 26 and 28, by the first mount 14 and second mount 16. The first and second mounts 14,16 include a configuration for receiving bearings and drive mechanisms of the roller tube 20. In the preferred exemplary embodiment illustrated in FIG. 3, the mounts 14, 16 comprise a pivot arm assembly 42. The pivot arm assembly 42 includes a body 44 having a pivot mount 46 coupled to a cover plate 48. The body 44 includes at least one bearing mount 50, and in a preferred exemplary embodiment, a central bearing receiver 52 bounded by opposing receivers 54, 56. The central bearing receiver 52 can receive an idler of the roller tube 20 and the opposing receivers 54, 56 can receive at least one of a drive motor and drive gears (not shown) or a pull chain and clutch mechanism (tape drive or chain drive) for the roller tube 20. In an exemplary embodiment, the drive motor can be mounted inside the roller tube for a compact arrangement. The appropriate gearing and drive mechanism can be coupled to the drive motor as is known in the art.

The pivot arm assembly 42 illustrated in FIG. 3 is shown with a ghost image of the pivot arm assembly 42 to indicate the range of motion and capacity to pivot up and down with the roller tube 20. In a preferred exemplary embodiment, the pivot arm assembly 42 can swing about pivot mount 46 through an angle 58. The angle 58 can include a range from about zero degrees to about 45 degrees depending on the roller tube 20 size and expected service. The first and second mounts 14, 16 are configured to support the roller tube 20 throughout the range of travel within the assembly 12. As the sheet material 18 winds and unwinds on the roller tube 20, the outside diameter of the roller tube 20 and material 18 wrapped thereon changes. The roller tube axis 30 moves relative to the cover plate 48 and fixed support cradle 32 (i.e., rotation and translation). Since the axis 30 translates as the roller tube 20 rotates about the axis 30, the receivers 52, 54, 56 should also move with the roller tube 20 and accompanying drive motor, gears and idlers associated with the roller tube 20. The exemplary embodiment of the pivot arm assembly 42 provides both the rotary support as well as the lateral support for the roller tube 20 while maintaining the roller tube 20 supported by the fixed support cradle 32. It is noted that the pivot mount 46 may be slightly elongated to maintain the roller tube 20 centered over the support cradle 36.

Figures 4, 5, 6:
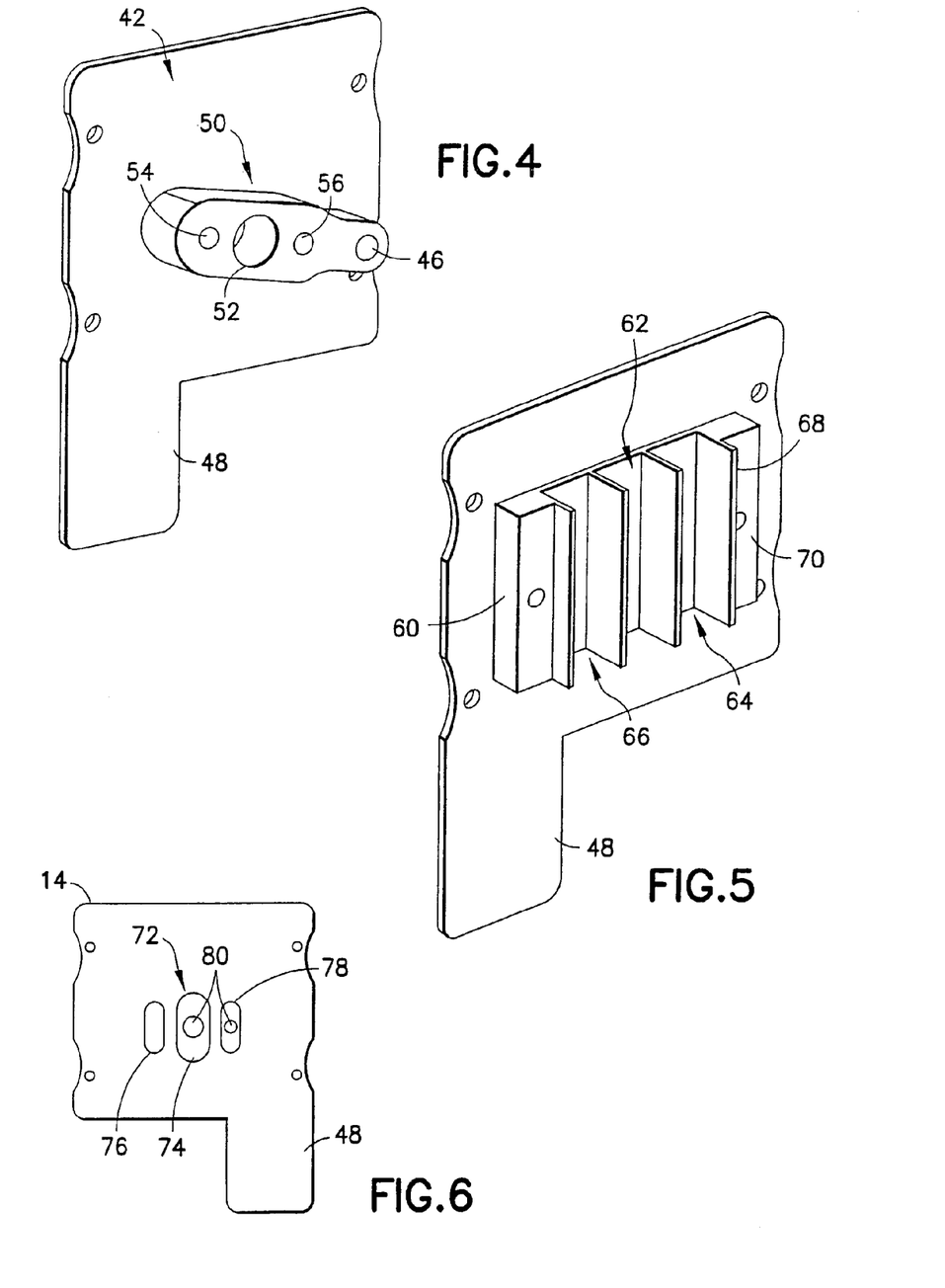
FIG. 4 is a perspective view of an exemplary mount.
FIG. 5 is a perspective view of another exemplary mount.
FIG. 6 is a perspective view of another exemplary mount.

FIGS. 4 through 6 are views of exemplary mounts 14, 16. FIG. 4 illustrates the pivot arm assembly 42, similar to the embodiment illustrated in FIG. 3. The pivot arm assembly 42 allows the roller tube 20 to be supported while concealing the mechanism. A superior appearance can be gained through concealing the pivot arm assembly 42 inside the assembly 12. Another embodiment is concealed behind the cover plate 48 of the mounts 14 and 16 as shown in FIG. 5.

In the embodiment of FIG. 5, a slotted insert 60 is attachable to the cover plate 48 of one or both of the mounts 14, 16. Alternatively, the slotted insert 60, mounts 14, 16, and cover plate 48 can all be formed as one piece, such as by casting. The slotted insert 60 serves the same function as the pivot arm assembly 42, of supporting the roller tube 20 in both translation and rotation. The slotted insert 60 includes an idler groove 62 formed between a pair of side grooves 64, 66. The idler groove 62 and side grooves 64, 66 can be formed as raised flanges 68 extending from a base 70. In another exemplary embodiment, the idler groove 62 and side grooves 64, 66 can be machined into the base 70, cast in the base 70, attached to the base 70, and the like. The centrally located idler groove 62 can receive a bushing or bearing axle of an idler coupled to the roller tube 20. The side grooves 64, 66 can receive a bushing or bearing or axle of a drive motor and/or gears of the roller tube 20. The slotted insert 60 is also concealed behind the cover plate 48 and provides an aesthetic quality to the assembly 12. A less elaborate embodiment can include slots formed in the cover plate 48, as shown in FIG. 6. A slotted embodiment, as shown in FIGS. 5 and 6, is particularly advantageous for roller tubes carrying a large amount of sheet material, where the overall diameter is so large that a pivot arm (see FIG. 4) would not maintain the roller tube body approximately centered within the support cradle.

The embodiment of FIG. 6 includes at least one slot 72 formed in the cover plate 48 of the mount 14, 16. A central slot 74 and opposing side slots 76, 78 can be formed in the mounts 14, 16 to support the roller tube in both rotation and translation. The less complex embodiment of the slots 74, 76, 78 reduces manufacturing with an aesthetic tradeoff, since the ends of the bearings, axles and bushings, shown generally as 80, are visible from the exterior of the assembly 12.

Figure 7:
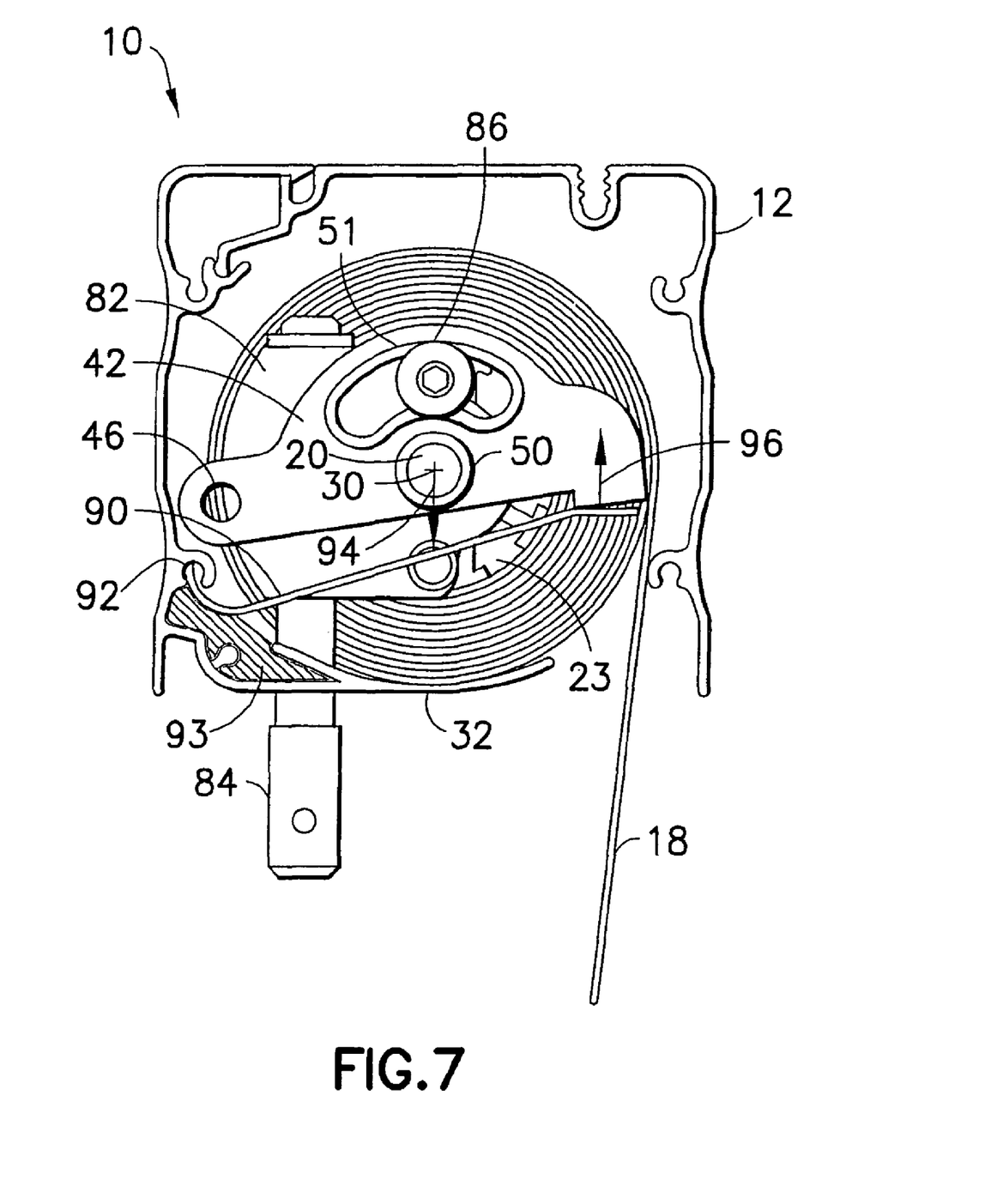
FIG. 7 is a side view of a first exemplary roller tube support assembly.
Figure 8A:
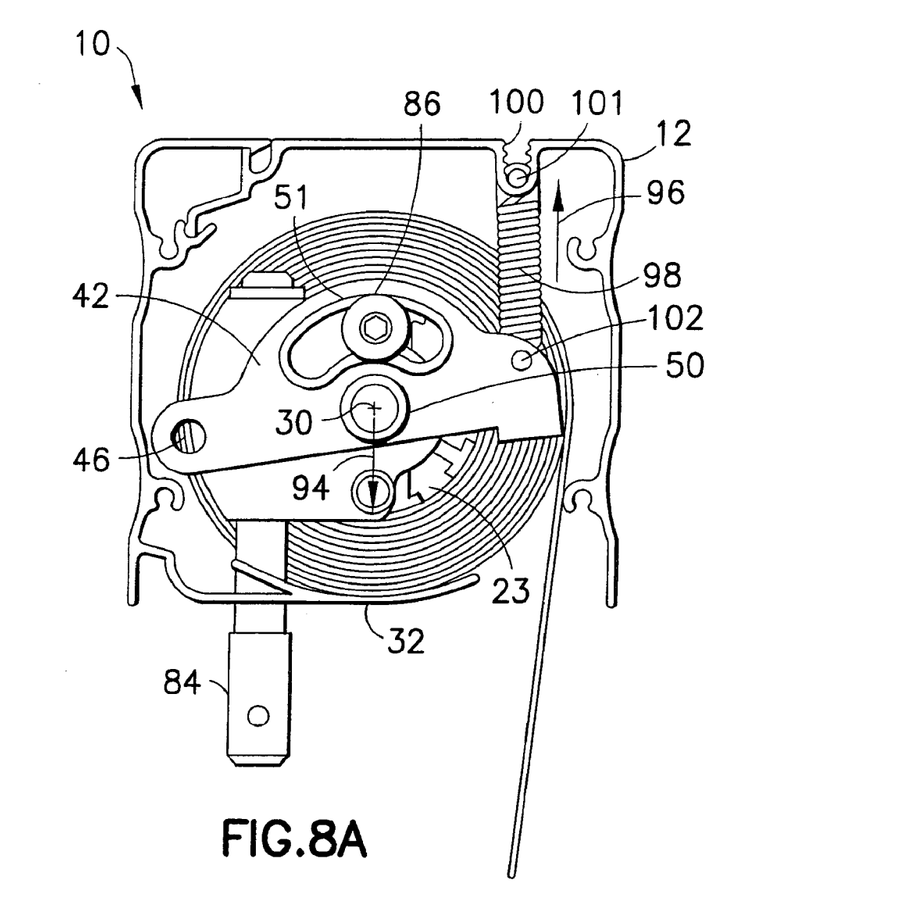
FIG. 8A is a side view of a second exemplary roller tube support assembly.
Figure 8B:
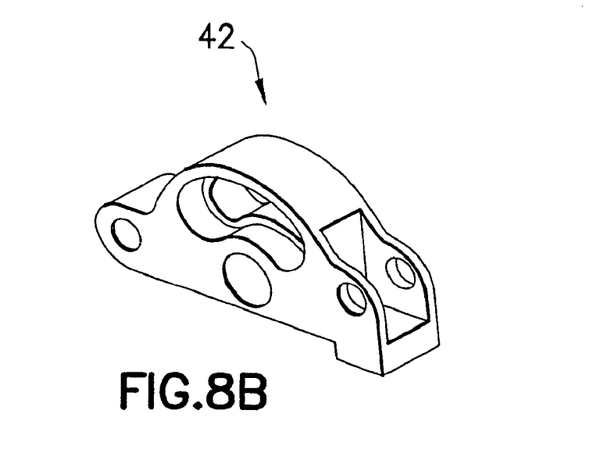
FIG. 8B is a perspective view of an exemplary pivot arm assembly.
Figure 9:
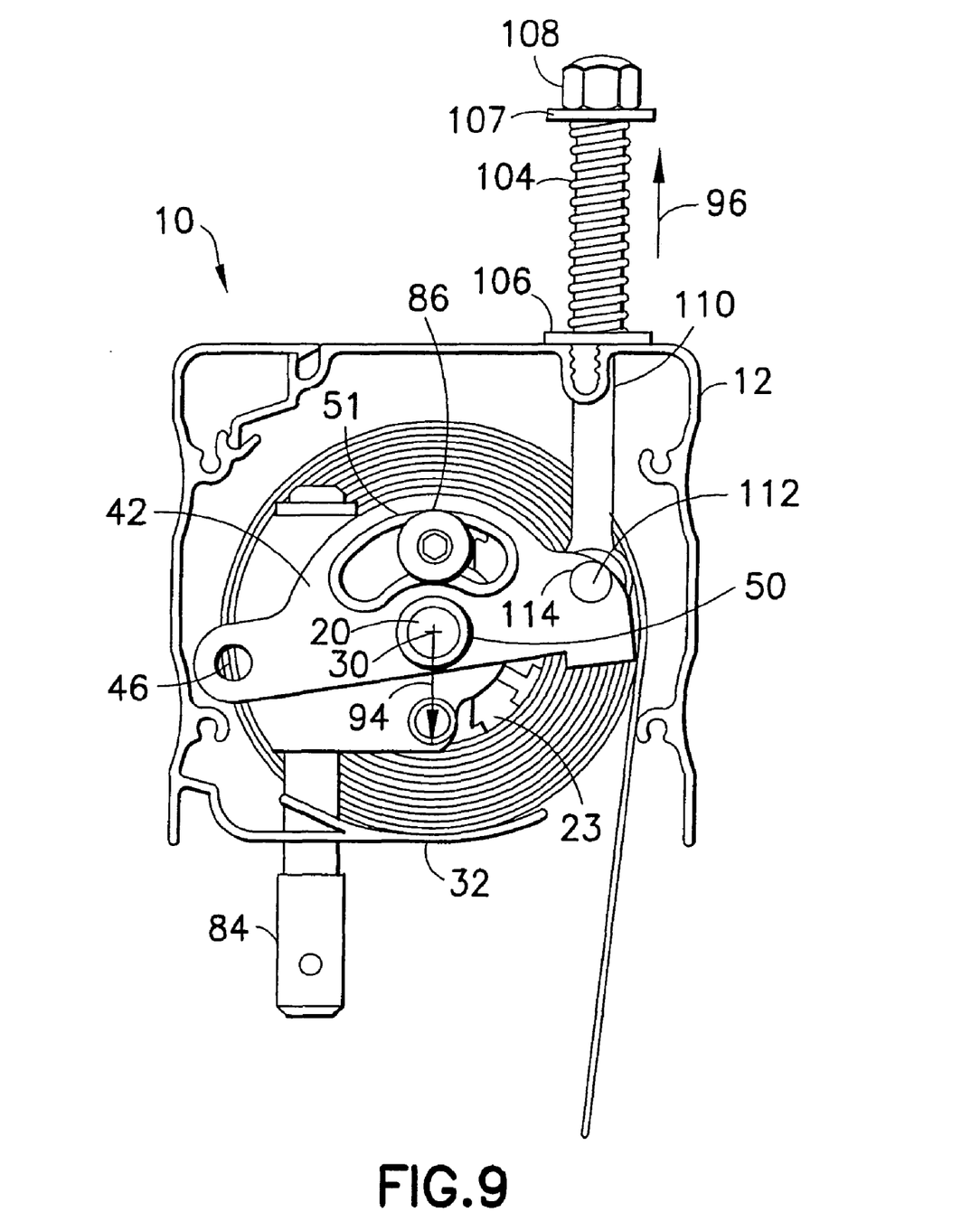
FIG. 9 is a side view of a third exemplary roller tube support assembly.

FIGS. 7, 8A and 9 are side views of exemplary biasing members 90, 98, and 104 shown in the assembly 12 as used with the pivot arm assembly 42 similar to the embodiment illustrated in FIG. 3. Configurations utilizing the idler groove depicted in FIG. 5 and the slots depicted in FIG. 6, not shown, may also be readily provided in accordance with this invention. The biasing members, 90, 98, and 104, reduce a force in a direction 94 towards the support cradle 32 by providing a force in an approximately opposite direction 96. FIG. 8B is a perspective view of an exemplary pivot arm assembly 42.

FIG. 7 includes a biasing member in the form of a leaf spring 90 fixedly mounted in a spring retainer slot 92 provided integrally to the assembly 12. The leaf spring 90 is fixedly mounted below and to the left of the axis of rotation 30 of the roller tube 20. The leaf spring 90 continuously contacts the pivot arm assembly 42. A drive gear assembly 82 is attached to a roller tube end cap 23 affixed at an end of the roller tube 20. The drive gear assembly 82 is a conventional gear housing (e.g. worm gear) designed to rotatably wind and unwind the sheet material 18. A drive handle 84 extends from the drive gear assembly 82. Turning the drive handle 84 rotates the drive gear assembly 82. A gear mount 86 passes through a pivot mount slot 51 on the pivot arm assembly 42 connecting the pivot arm assembly 42 to the drive gear assembly 82. The pivot mount slot 51 allows the pivot arm to translate as the diameter of the roller tube 20 decreases or increases. The leaf spring biasing member 90 reduces the force of the roller tube 20 in the direction 94 of the support cradle 32 with a low cost and aesthetic result. The reducing force provided by the leaf spring 90 may be modified at the time of installation by replacing the leaf spring 90 with an alternate leaf spring having a different tension. Heavy and light tension leaf springs are available for use depending on the weight of the roller tube body 22 (see FIG. 1) and sheet material 18 and/or the torque of the drive motor. The installer can determine the appropriate leaf spring tension during installation. If the motor grinds, a heavier tension leaf spring is required. If the roller tube 20 lifts off the support cradle 32, a lighter tension leaf spring is required.

FIG. 8A provides another exemplary embodiment of the biasing member in the form of a coil spring 98. This configuration provides increased flexibility in the force 96 provided. A spring retainer 100 is provided integral to the assembly 12 fixedly mounting the coil spring 98 above the axis of rotation 30 of the roller tube 20. A pin 101 passes through the assembly 12 and the coil spring 98 to pivotally attach the coil spring 98 to the assembly 12. A pivot arm coil spring mount 103 is provided on the pivot arm assembly 42 to attach the coil spring 98 to the pivot arm assembly 42. A second pin 102 passes through the pivot arm assembly 42 and the coil spring 98 to pivotally attach the coil spring 98 to the pivot arm assembly 42.

FIG. 9 provides a further exemplary embodiment of the biasing member in the form of a compression spring 104. This configuration provides the most flexibility in the force 96 provided. However, the aesthetics are reduced because the functional parts are not internal to the assembly 12. A threaded eye rod 110 is fixedly mounted to the assembly 12 above the axis of rotation 30 of the roller tube 20. The compression spring 104 is mounted on the threaded eye rod 110 external to the assembly between a washer 106 and a washer 107 under the head of nut 108. The nut 108 may be adjusted to increase or decrease the force 96 provided by the compression spring 104. A pivot arm compression spring mount 112 is provided in the pivot arm assembly 42 through which a compression spring pin 114 pivotally attaches the threaded eye rod 110 to the pivot arm assembly 42.

Figure 10:
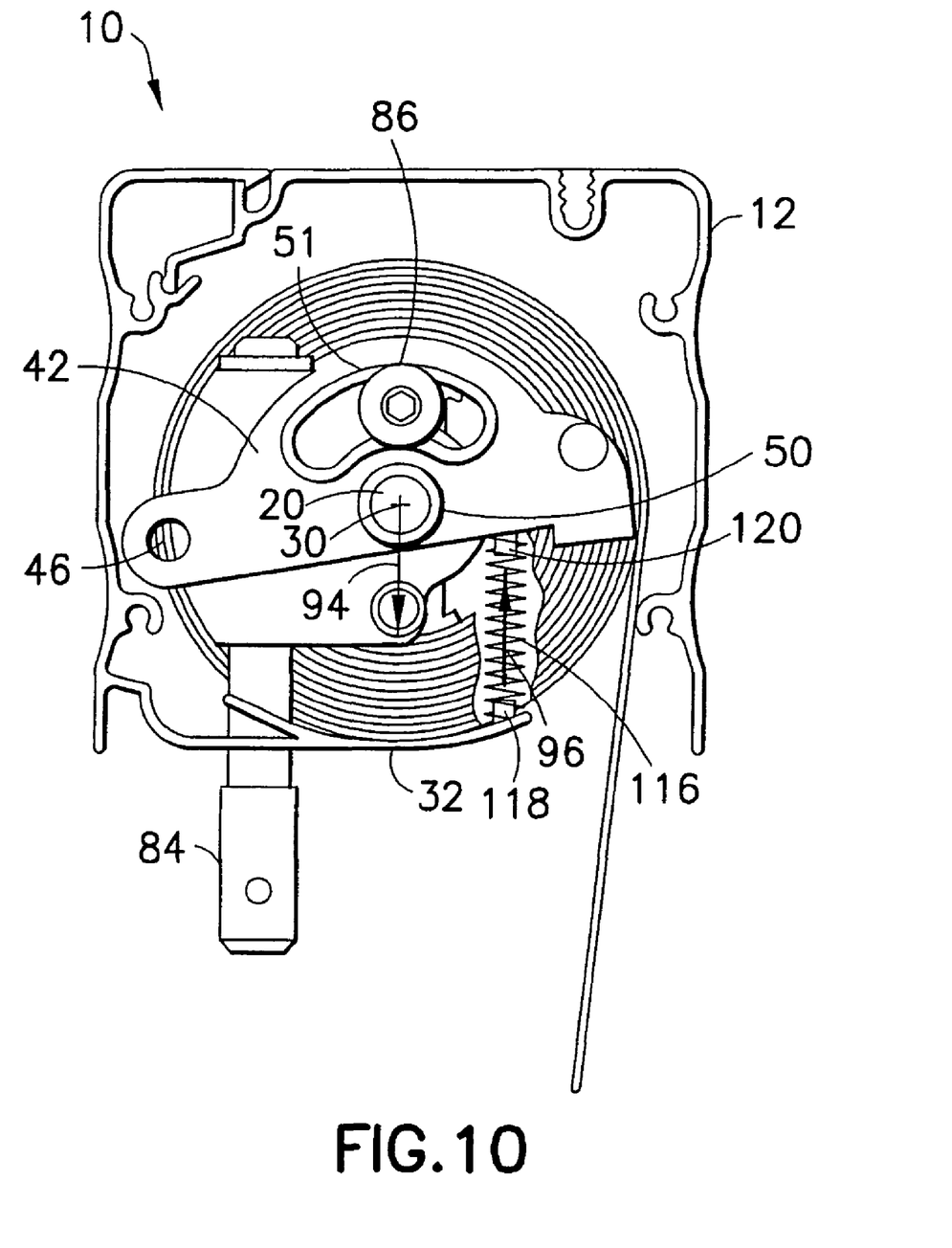
FIG. 10 is a side view of a fourth exemplary roller tube support assembly.

FIG. 10 provides a further exemplary embodiment of the biasing member in the form of an internal compression spring 116. A first spring retainer 118 may be fixedly mounted to, e.g., an outside edge of the support cradle 32. The first spring retainer 118 may be formed integral to the support cradle 32 such as by casting or extrusion, or may be fixedly mounted such as by a machine screw, bolt or similar means (not shown) as is common in the art. A second spring retainer 120 may be fixedly mounted to the pivot arm assembly 42. The second spring retainer 120 may be formed integral to the pivot arm assembly such as by casting or extrusion, or may be fixedly mounted such as by a machine screw, bolt or similar means (not shown) as is common in the art. The reducing force 96 may be adjusted by providing a different internal compression spring 116 with greater or lesser tension as may be required by the application. Alternatively, means of adjustment such as a threaded rod (not shown) may be provided to adjust the reducing force 96 without disassembly.

Figure 11:
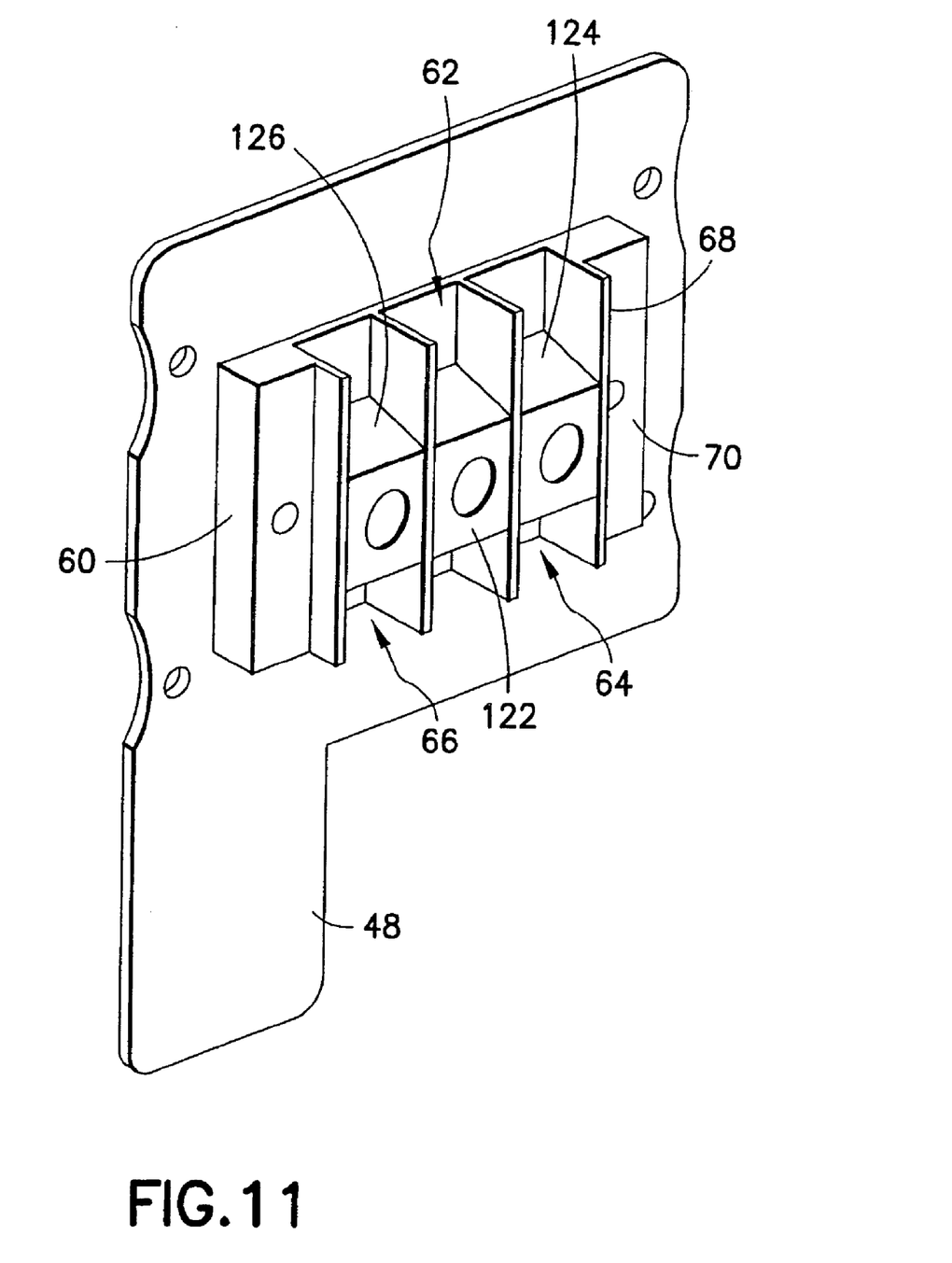
FIG. 11 is a perspective view of another exemplary mount.

FIG. 11 is a perspective view of exemplary mounts 14, 16 including a slotted embodiment similar to the slotted embodiment disclosed in FIG. 5. At least one sliding block 122 may be provided within the slots to guide the drive or idler for better rigidity and alignment. A central sliding block 122 may be movably positioned in an idler groove 62. A pair of side sliding blocks 124, 126 may be movably positioned within a pair of side grooves 64, 66. The sliding blocks may be aluminum, PVC or other durable material. The central sliding block 122 can receive a bushing or bearing axle of an idler coupled to the roller tube 20. The side sliding blocks 124, 126 can receive a bushing or bearing or axle of a drive motor and/or gears of the roller tube 20.

Figure 12:
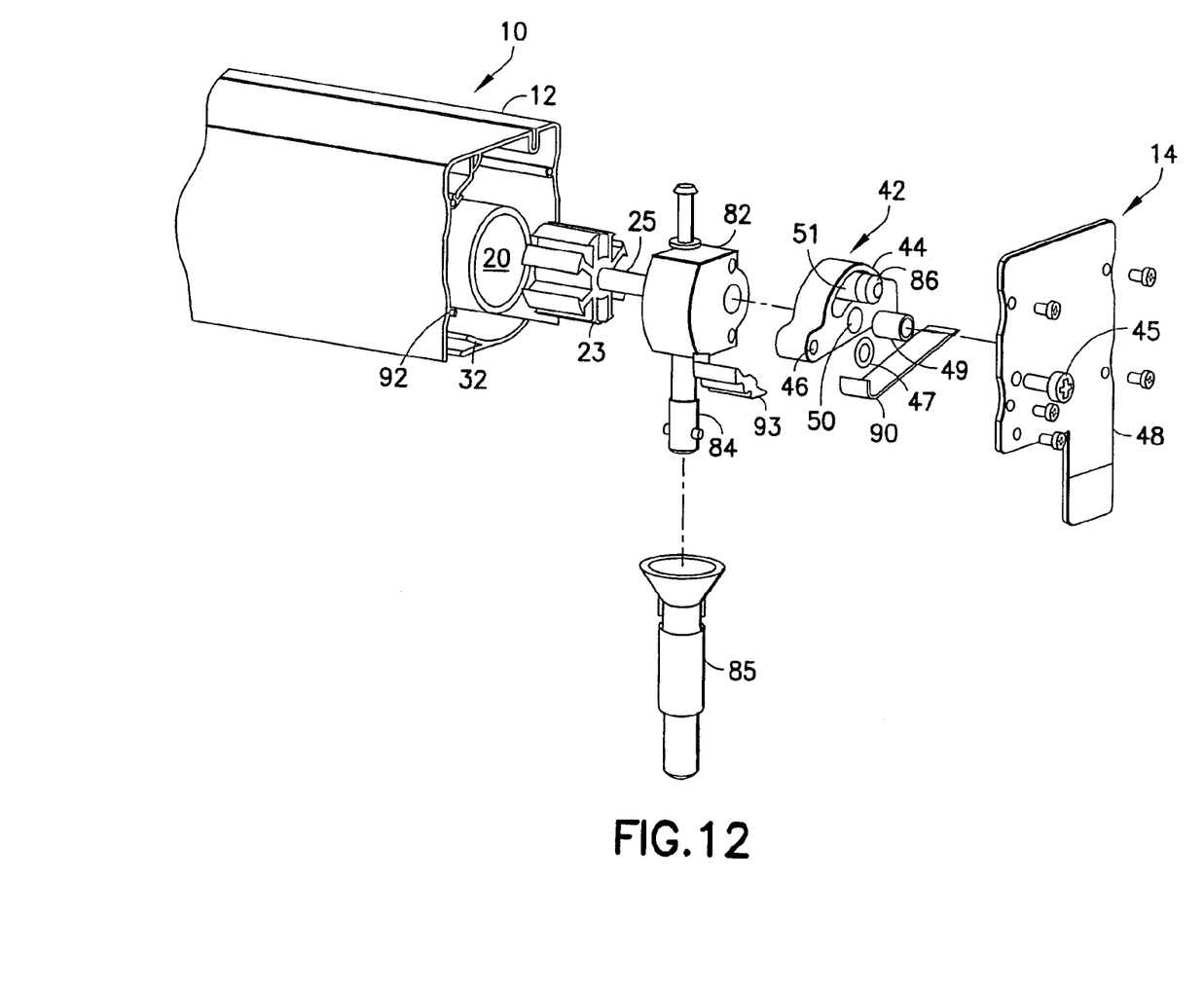
FIG. 12 is an exploded perspective view of an exemplary roller tube support assembly.

FIG. 12 is an exploded perspective view of an exemplary roller tube mechanism 10 including a pivot arm 42 mount and a leaf spring 90 biasing member. The roller tube mechanism 10 includes an assembly 12 that extends laterally between a first mount 14 and a second mount (not shown) opposite the first mount 14. The assembly 12 can be mounted on a wall, ceiling, or the like, to provide a stable position to deploy a sheet material (not shown).

A roller tube 20 is rotatably mounted in the assembly 12. The roller tube 20 can be pivotally supported on the first mount 14 and/or the second mount. The roller tube 20 is configured to support the sheet material (not shown). A support cradle 32 is coupled to the assembly 12. The support cradle 32 is configured to support the roller tube 20 and sheet material (not shown) wound thereon. In an exemplary embodiment, the support cradle 32 can comprise a portion of the assembly 12. In another embodiment, the support cradle 32 can be formed separate from the assembly 12 and coupled to the assembly 12.

The first mount 14 can include a cover plate 48. A pivot support 45 passes through the cover plate 48 and a pivot washer 47 to pivotally support the pivot arm assembly 42. The pivot support 45 may be a machine screw, bolt or any other fixing mounting means. The pivot support 45 may be threadingly engaged directly into a pivot mount 46 of a pivot arm body 44. The pivot washer 47 may be a PVC or Teflon washer with a surface passing through the cover plate 48 to limit friction on the pivot support 45. The leaf spring 90 continuously contacts the pivot arm assembly 42. The leaf spring 90 may be fixedly mounted to the assembly 12 by a spring retainer 93 slidingly engaged in a spring retainer slot 92 located on the assembly 12. The spring retainer slot 92 may be formed integrally to the assembly 12 by casting or extrusion. The spring retainer 93 may be a machined or cast part of a metal such as aluminum or durable plastic formed to create a fixing surface between the leaf spring 90 and the assembly 12, particularly the spring retainer slot 92.

A drive gear assembly 82 is attached to a roller tube end cap 23 affixed at an end of the roller tube 20. The drive gear assembly 82 is a conventional gear housing (e.g. worm gear) designed to rotatably wind and unwind the sheet material (not shown). A drive handle 84 extends from the drive gear assembly 82. Turning the drive handle 84 rotates the drive gear assembly 82. A drive handle extension 85 may be provided to connect to the drive handle 84 and facilitate rotating the drive handle 84 via a crank (not shown). A gear mount 86 passes through a pivot mount slot 51 on the pivot arm assembly 42 connecting the pivot arm assembly 42 to the drive gear assembly 82. The gear mount may be a screw with a smooth shoulder threadingly engaged to the drive gear assembly 82 to allow the pivot arm to translate as the diameter of the roller tube 20 decreases or increases. The roller tube end cap 23 may be attached to the drive gear assembly 82 by a drive bar 25. The drive bar 25 may be square stock or other non-smooth shape so that rotation of the drive gear assembly 82 provides rotation of the roller tube end cap 23. The drive bar 25 passes through the drive gear assembly 82 and rotatably engages the pivot arm assembly 42 in a bearing mount 50 via a bearing 49. The bearing 49 may be Teflon or smooth plastic to allow the drive bar 25 to smoothly rotate within the bearing mount 50 while maintaining the pivot arm assembly 42 relative to the roller tube 20.

The exemplary roller tube support assembly disclosed herein provides the advantage of supporting the roller tube without the need for complex moving parts. The roller tube and sheet material wrapped around the roller tube can be supported along their entire length. The problem of bowing and sagging across the roller tube and the resultant smile-shaped surface discontinuities on the sheet material are prevented as a result of the novel support assembly. Further advantages of the disclosed roller tube support assembly include the support cradle and assembly being formed integral improving strength, lowering weight and manufacturing costs. The novel assembly and support cradle allow for a variety of mounts to be employed in mounting the roller tube in the assembly. Moreover, a reduced diameter roller tube can be used, since the sheet material and roller tube are supported over the length of the roller tube, enabling a significant reduction of the size of the housing for the roller tube, as compared to prior art systems. For example, a housing provided by the present invention may be only about 3 inches by 3 inches in cross-section for a given width solar screen, projection screen, or the like, whereas the prior art devices require larger diameter roller tubes for the same screen and are typically 8 inches by 8 inches or greater in cross-section. One skilled in the art will recognize that an assembly in accordance with the present invention can be provided in any practical size depending on the particular requirements of the application. Further, because of the small form factor of the roller tube system provided by the present invention (e.g., as compared to prior art screens) a roller tube system in accordance with the present invention may be mounted to the ceiling, whereas the prior art devices (especially projection screens) had to be recessed into the ceiling, often requiring cutting of joists and building new headers at considerable time and expense. A further enhancement is the reduction of friction force between the sheet material wound on the roller tube and the support cradle while the roller tube is rotated. This allows lower power motors and drive shafts to be provided to overcome the resistance created by the friction between the support cradle and the material as it is wound and unwound on the roller tube.

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A roller tube and support assembly, said roller tube being adapted to support a sheet material wound therearound, said support assembly comprising:
   a housing having a first end and a second end opposite said first end;
   a first mount at said first end of the housing;
   a second mount at said second end of the housing;
   said mounts configured to rotatably support said roller tube horizontally therebetween;
   said roller tube having a longitudinal axis extending from said first mount to said second mount;
   said first mount comprising a pivot arm rotatably supporting an end of said roller tube;
   said second mount comprising at least one slot and a sliding block movably positioned in said at least one slot;
   at least one support cradle disposed between said first and second mounts, said support cradle being positioned underneath and parallel to the longitudinal axis of said roller tube and configured to carry said roller tube and sheet material wound therearound on a surface of the support cradle to support a weight of said roller tube and sheet material along a length of the roller tube; and
   a spring assembly having a first end coupled to said housing and a second end coupled to said pivot arm to bias said roller tube upwardly in a direction away from said support cradle, thereby reducing the effective weight of said roller tube and sheet material supported by said support cradle.

2. The support assembly of claim 1 wherein,
   said spring assembly is disposed near said first mount; and
   a second spring assembly is disposed near said second mount.

3. The support assembly of claim 1 wherein said spring assembly is disposed in a spring assembly retainer.

4. The support assembly of claim 3 wherein said spring assembly retainer is disposed on one of:
   (i) said support cradle,
   (ii) said first mount,
   (iii) said second mount.

5. The support assembly of claim 3 wherein said spring assembly retainer is integral to one of:
   (i) said support cradle,
   (ii) said first mount,
   (iii) said second mount.

6. The support assembly of claim 1 wherein said spring assembly comprises one of
   (i) a leaf spring,
   (ii) a coil spring,
   (iii) a compression spring,
   (iv) a gas spring,
   (v) a urethane spring.

7. The support assembly of claim 1 wherein said support cradle is fixed between said first and second mounts.

8. The support assembly of claim 1 wherein said first mount and second mount are configured to guide and support said roller tube responsive to a variable diameter of said roller tube and sheet material.

9. The support assembly of claim 1 wherein said support cradle continues to carry said roller tube and sheet material on said surface to support said weight as said sheet material winds onto and unwinds from said roller tube causing a variable diameter of said roller tube and sheet material.

10. The support assembly of claim 1 wherein said at least one support cradle supports said roller tube along substantially the entire length of the roller tube.

11. The support assembly of claim 1 wherein said support cradle supports said roller tube in at least one location between said first and second mounts.

12. The support assembly of claim 1 wherein said spring assembly is fixedly mounted in at least one of the following orientations:
   (i) above said longitudinal axis of said roller tube,
   (ii) below said longitudinal axis of said roller tube,
   (iii) laterally to said longitudinal axis of said roller tube.

13. The support assembly of claim 1 wherein said sheet material comprises one of
   (i) a screen configured to shade sunlight,
   (ii) a fabric configured to shade sunlight,
   (iii) a screen configured for image projection,
   (iv) a screen configured to block insects.

14. A roller tube and support assembly, said roller tube being adapted to support a sheet material wound therearound, said support assembly comprising:
   a housing having a first end and a second end opposite said first end;
   a first mount at said first end of the housing;
   a second mount at said second end of the housing;
   said mounts configured to rotatably support said roller tube horizontally therebetween;
   said roller tube having a longitudinal axis extending from said first mount to said second mount;
   at least one of said first and second mounts comprising a pivot arm rotatably supporting an end of said roller tube;
   an aperture through said pivot arm forming a pivot mount slot;
   a gear mount fixedly connected to a roller tube end cap and passing through said pivot mount slot;
   at least one support cradle disposed between said first and second mounts, said support cradle being positioned underneath and parallel to the longitudinal axis of said roller tube and configured to carry said roller tube and sheet material wound therearound on a surface of the support cradle to support a weight of said roller tube and sheet material along a length of the roller tube; and
   a spring assembly having a first end coupled to said housing and a second end coupled to said pivot arm to bias said roller tube upwardly in a direction away from said support cradle, thereby reducing the effective weight of said roller tube and sheet material supported by said support cradle.

15. A method of supporting a roller tube comprising:
   disposing a sheet material on said roller tube, said roller tube comprising a roller tube body having a first end, a second end, and a longitudinal axis, said sheet material being wound around said roller tube body along a length of said roller tube body between said first end and said second end;
   mounting said roller tube in a housing comprising a first mount and a second mount opposite thereto, at least one of said mounts comprising a pivot arm;
   supporting said roller tube on said first mount and said second mount in both a rotary motion and a translational motion responsive to a variable diameter of said sheet material on said roller tube, wherein said roller tube is rotatable about said longitudinal axis for winding and unwinding said sheet material on said roller tube;
   carrying said roller tube on a support cradle portion of said housing, said support cradle being positioned underneath and parallel to the longitudinal axis of said roller tube, and adapted to carry said roller tube and sheet material wound therearound on a surface of the support cradle to support a weight of said roller tube and sheet material along a length of the roller tube; and
   providing a spring assembly having a first end coupled to said housing and a second end coupled to said pivot arm to impart an upward force to said roller tube away from said support cradle, thereby reducing the effective weight of said roller tube and sheet material on said support cradle;
   wherein said first mount comprises said pivot arm and said second mount comprises one of:
      (i) a slot formed in said housing,
      (ii) a slotted insert mounted in an interior of said housing,
      (iii) a pivot arm assembly mounted in said interior.

16. The method of claim 15 further comprising disposing said spring assembly near at least one of said first and second mounts to impart said force.

17. The method of claim 16 wherein said spring assembly is disposed on one of:
   (i) said support cradle,
   (ii) said first mount,
   (iii) said second mount.

18. The method of claim 16 further comprising concealing said spring assembly in an interior of said housing.

19. The method of claim 15 further comprising: concealing said first mount and said second mount in said interior of said housing.

20. The method of claim 15 wherein said support cradle contacts said sheet material below said longitudinal axis of said roller tube.

21. The method of claim 15 wherein said support cradle supports said roller tube substantially entirely along said length.

22. The method of claim 15 wherein said support cradle supports said roller tube in at least one location between said first and second mounts.

23. The method of claim 15 further comprising adjusting said upward force of said roller tube.

24. A roller tube and support assembly, said roller tube being adapted to support a sheet material wound therearound, said support assembly comprising:
   a housing including a first mount and a second mount opposite said first mount, at least one of said mounts comprising a pivot arm;
   said mounts configured to horizontally and rotatably support said roller tube when said roller tube has material wound thereon;
   a continuous support cradle disposed between said first and second mounts, said support cradle positioned underneath and parallel to an axis of rotation said roller tube, and configured to carry said roller tube and material wound therearound on a surface of the support cradle to support said roller tube via said material wound thereon along substantially an entire length of the roller tube as said material winds onto and unwinds from the roller tube; and
   a spring assembly having a first end coupled to said housing and a second end coupled to said pivot arm to bias said roller tube upwardly in a direction away from said support cradle, thereby reducing the effective weight of said roller tube and material supported by said support cradle;

wherein said first mount comprises said pivot arm and said second mount includes:
   at least one slot, and
   a sliding block movably positioned in said at least one slot.

25. The support mechanism of claim 24 wherein said sheet material comprises one of (i) a screen configured to shade sunlight,
(ii) a fabric configured to shade sunlight,
(iii) a screen configured for image projection,
(iv) a screen configured to block insects.

* * * * *